United States Patent
Yasuo et al.

(10) Patent No.: US 7,276,311 B2
(45) Date of Patent: Oct. 2, 2007

(54) FUEL CELL HAVING TEMPERATURE ADJUSTMENT MEANS FOR REACTION GAS

(75) Inventors: Takashi Yasuo, Osaka-fu (JP); Akira Hamada, Osaka-fu (JP); Hirokazu Izaki, Osaka-fu (JP); Shuuichi Suzuki, Osaka-fu (JP); Kunihiro Nakato, Osaka-fu (JP); Yasuo Miyake, Osaka-fu (JP)

(73) Assignee: Sanyo Electric Co., Ltd., Osaka-fu (JP)

(*) Notice: Subject to any disclaimer, the term of this patent is extended or adjusted under 35 U.S.C. 154(b) by 0 days.

(21) Appl. No.: 10/230,589

(22) Filed: Aug. 29, 2002

(65) Prior Publication Data
US 2003/0068543 A1   Apr. 10, 2003

(30) Foreign Application Priority Data
Aug. 30, 2001 (JP) .............................. 2001-261570
Nov. 9, 2001 (JP) .............................. 2001-344867

(51) Int. Cl.
*H01M 8/10* (2006.01)
*H01M 2/00* (2006.01)
*H01M 2/14* (2006.01)

(52) U.S. Cl. .............................. 429/38; 429/30; 429/34

(58) Field of Classification Search .................. 429/30, 429/34, 38
See application file for complete search history.

(56) References Cited

U.S. PATENT DOCUMENTS 5,034,287 A * 7/1991 Kunz .......................... 429/13
6,492,055 B1 * 12/2002 Shimotori et al. ............. 429/34
6,635,375 B1 * 10/2003 Geisbrecht et al. ........... 429/30
2001/0004500 A1 * 6/2001 Grasso et al. ................ 429/13

FOREIGN PATENT DOCUMENTS

JP    2000-090947    * 3/2000

* cited by examiner

*Primary Examiner*—Dah-Wei Yuan
(74) *Attorney, Agent, or Firm*—Weingarten, Schurgin, Gagnebin & Lebovici LLP

(57) ABSTRACT

The present invention provides a polymer electrolyte fuel cell capable of eliminating condensate water, and preventing flooding due to an excessively humidified electrode by a simple structure and easy processing composition.

A fuel cell comprising a plurality of stacked cells where separators having respectively a fuel gas passage or an oxidant gas passage formed on the surface thereof are opposed to a fuel electrode or an air electrode and an electrolyte membrane is arranged between the fuel electrode and the air electrode, in which a drainage means is disposed downstream the middle of the fuel gas passage or oxidant gas passage. In addition, a temperature adjustment means for adjusting the temperature of the fuel or the oxidant is provided at least at one point in the path from the supply inlet to the discharge exit of at least one passage of fuel electrode side or the air electrode side.

5 Claims, 7 Drawing Sheets

FUEL CELL HAVING TEMPERATURE ADJUSTMENT MEANS FOR REACTION GAS

BACKGROUND OF THE INVENTION

1. Field of the Invention

The present invention concerns a fuel cell, and more particularly polymer electrolyte fuel cell, for excluding condensate water generated in a cell body, and preventing flooding due to an excessive humidification of an electrode.

2. Detailed Description of the Prior Art

A solid polymer type fuel cell is formed, as schematically shown in FIG. 7, by laminating a plurality of basic unit I composed by pinching a cell H where a fuel electrode B (anode) is disposed on one of faces of an electrolyte membrane A (solid polymer electrolyte membrane) and an air electrode C (cathode) on the other face respectively, by a separator J where a fuel gas flowing passage D is formed on the fuel electrode side, and an oxidant gas flowing passage F on the air electrode side (3 cells are stacked in FIG. 7). For instance, a plate E where only the fuel gas flowing passage D is formed and a plate G where only the oxidant flowing passage F is formed, are disposed respectively on both sides of a stacked body of this fuel cell.

In the aforementioned polymer electrolyte fuel cell, the fuel electrode side passage D is supplied with a fuel gas (normally, a reformed gas made by reforming a raw fuel into a hydrogen rich gas by a reformer) and, at the same time, the air electrode side passage F is supplied with an oxidant gas (normally, air), electricity is generated by the occurrence of electrochemical reaction through the electrolyte membrane A, and generated water is simultaneously. In short, the fuel cell can generate electricity through the electrochemical reaction between hydrogen gas in the reformed gas and oxygen gas in the air. A reaction for separating a hydrogen molecular into hydrogen ions (proton) and electrons occurs at the fuel cell B while a reaction for generating water from oxygen, hydrogen ion and electron occurs at the air electrode C respectively, the load is supplied with electricity by electrons moving through an external circuit from the fuel electrode B to the air electrode C and, at the same time, water is generated on the air electrode C side.

Fuel electrode: $H_2 \rightarrow 2H^+ + 2e^-$

Air electrode: $4H^+ + O_2 + 4e^- \rightarrow 2H_2O$

Whole: $2H_2 + O_2 \rightarrow 2H_2O$

For the aforementioned polymer electrolyte fuel cell, in case where the electrolyte membrane A is not wet, it does not function satisfactorily as proton electric conductor; therefore, the fuel gas or oxidant gas is humidified, and supplied to the fuel cell body as wet fuel gas or wet oxidant gas, and the electrolyte membrane A is held wet appropriately with moisture continued in these gases. However, in the step of flowing wet oxidant gas through the passage F, water generated on the air electrode C is added in the form of water vapor, making the moisture excessive as it progresses in the passage F, and especially in the downstream side from the middle, it becomes supersaturated and the moisture will be condensed. If this condensate water deposits on the surface of the passage F, and a part of the passage F comes to be clogged, biasing the oxidant gas flow distribution in the passage F, the supply of oxidizing agent gas will locally be clogged, deteriorating the power generation performance. Such clogging of the passage by condensate water may also be provoked in the fuel electrode B side passage D by the back diffusion of generated water.

As a means for resolving this problem, for instance, Japanese Patent Laid-Open No. 1994-89730 discloses a technology for installing a condensate water elimination means comprising a non-humidified oxidant supply unit and a water absorbing material in the middle of the oxidant gas passage. In this case, a dry oxidant gas supplied from the condensate water elimination means is added to the wet oxidant gas from the upstream side thereof, thereby the water vapor partial pressure in the downstream oxidant gas is lowered, and the supersaturated state of the oxidant gas is resolved, the evaporation of condensate water is facilitated and, at the same time, the water absorbing material absorbs condensate water condensed on the inner wall surface of the passage in contact with the upstream side of the non-humidified oxidant supply unit to prevent the passage from clogging. However, according to the aforementioned example, it is necessary to dispose the non-humidified oxidant supply unit and the water absorbing material in the middle of the oxidant gas passage of the separator and to form two oxidant gas passages, humidified and non-humidified, making the structure complicated and the processing difficult. In addition, the control was difficult, because the non-humidified gas cannot be supplied without pressure difference, flow rate and pressure depend on the power generation conditions, or gas distribution in the passage can be disturbed.

Therefore, it is an object of the present invention to supply a polymer electrolyte fuel cell capable of eliminating condensate water, and preventing flooding due to an excessively humidified electrode by a simple structure and easy processing composition.

SUMMARY OF THE INVENTION

In order to solve the object, the present invention is characterized by:

(1) A fuel cell comprising a plurality of stacked cells where separators having respectively a fuel gas passage or an oxidant gas passage formed on the surface thereof are opposed to a fuel electrode or an air electrode and an electrolyte membrane is arranged between the fuel electrode and the air electrode, in which a drainage means is disposed more downstream than the middle of the fuel gas passage or oxidant gas passage.

(2) The drainage means has a sealing portion serving a gas seal.

(3) The drainage means is communicated with a cooling water passage of the fuel cell.

(4) A connection portion for communicating a plurality of passages is provided downstream the middle of the fuel gas passage or oxidant gas passage, and is communicated to the discharge means.

(5) The connection portion is disposed out of a fuel cell reaction zone where the electrolyte membrane is sandwiched between the fuel electrode and the air electrode.

(6) The connection portion is disposed in protrusion into a supply manifold area of any one of fuel gas, oxidant gas or cooling water.

(7) Heat is exchanged between the oxidant gas or fuel gas flowing through the connection portion and any one of oxidant gas, fuel gas or cooling water before supplied to the fuel cell reaction.

(8) The drainage means is a passage communicating a drainage manifold of these gasses and the connection portion, separately from the passage of oxidant gas and fuel gas.

(9) Textile material is put in the passage communicating the drainage manifold of the gas and the connection portion.

According to the present invention, a part of condensate water generated upstream the passage can be discharged outside, by a composition (1) in which a drainage means is disposed downstream the middle of the fuel gas passage or oxidant gas passage. The drainage means can prevent gas flowing in the passage from bleeding by a composition having a sealing portion becoming a gas seal, and can effectively use discharge condensate water as a part of cooling water for the fuel cell, by a composition (3) of communicating the drainage means with a cooling water passage of the fuel cell.

Besides, the gas flow rate is reduced to generate condensate water easily at the connection portion, and condensate water can be discharged outside rapidly by the drainage means, through a composition (4) of disposing a connection portion for communicating a plurality of passages downstream the middle of the gas passage, and communicating this connection portion with the discharge portion.

This connection portion can facilitate the cooling of water vapor in the connection portion and improve the drain effect by a composition (5) of disposing out of a fuel cell reaction zone where the electrolyte membrane is sandwiched between the fuel electrode and the air electrode. Moreover, the connection portion can increase the cooling effect and at the same time uniform the flow distribution (flow rate distribution) in the cell lamination direction by the formation of a throttle passage in the supply manifold, by a composition (6) of disposing in protrusion into a supply manifold area of any one of fuel gas, oxidant gas or cooling water. Moreover, the composition (7) allows to exchange heat between the oxidant gas or fuel gas flowing through the connection portion and any one of oxidant gas, fuel gas or cooling water before supplied to the fuel cell reaction.

Moreover, the drainage means can be disposed in the separator by a composition (8) making the drainage means the passage communicating a drainage manifold of oxidant gas and fuel gas and the connection portion, separately from the passage of these gases, and condensate water is absorbed or directed to the drainage manifold by capillarity, and gas is prevented from bleeding into the passage by a composition (9) of laying textile material in this passage.

Further, the present invention is characterized by:

(10) A fuel cell supplied with fuel and oxidant for power generation in which a temperature adjustment means for adjusting the temperature of the fuel or the oxidant is provided at least at one point in the path from the supply inlet to the drainage exit of at least one passage of fuel electrode side or the air electrode side.

(11) The path of the passage passes through by a plurality of times for one temperature adjustment means.

(12) The temperature adjustment means is disposed outside the electrode face.

(13) The temperature adjustment means is a cooling apparatus.

(14) The cooling apparatus is disposed in the latter half portion of the passage.

(15) The fuel or oxidant passing through the cooling apparatus is gaseous.

(16) The cooling apparatus is provided with a drain portion for removing condensate water generated during the gas cooling from the passage.

(17) The cooling apparatus is the one for the passage by cooling water or air.

(18) A fuel cell supplied with fuel and oxidant for power generation, in which a humidity control means for adjusting the moisture of the fuel or the oxidant is provided at least at one point in the path from the supply inlet to the drainage exit of at least one passage of fuel electrode side or the air electrode side.

(19) The humidity control means is a dehumidifier system.

(20) The dehumidifier system comprises a water retention portion on a part of the path outer wall of the passage, and supplies to gas for dehumidifying from a dehumidification passage provided separately from the passage to come into contact with this water retention portion in order to dehumidify.

(21) The path of the passage passes through the dehumidifier system by at least one time.

(22) The dehumidifier system is disposed in the latter half portion of the passage.

(23) The dehumidifying gas is at least one of fuel or oxidant not saturated with water vapor, which is supplied to the fuel cell, after the dehumidification, by adding partially, totally or newly fuel/oxidant gas.

(24) The dehumidifying gas is supplied from a plurality of points of the fuel cell stack.

The temperature adjustment means (cooling apparatus) of the present invention is disposed in a part of the reaction gas (fuel or oxidant) passage, in order to cool the reaction gas in the passage to any temperature outside the electrode face of the fuel cell. According to the structure of the present invention, the gas flow in the passage can not be disturbed, because no new gas is mixed from the middle of the passage.

Besides, it is preferable that the temperature adjustment means is in the latter half portion of the passage, because the reaction gas is wetter more downstream the passage due to water produced on the cathode side.

Moreover, in the case of wet reaction gas, the cooling may produce condensate water; therefore, it is preferable to dispose a drain portion so that this condensate water can be removed from the passage.

In this case, the temperature distribution over the electrode surface can be uniformed and the cell performance can be improved, as the reaction gas can be cooled at the area where the reaction gas became wetter and the temperature can be lowered.

The humidity control means (dehumidifier system) of the present invention comprises a water retention portion in the middle of the gas passage, and makes dry gas into contact with this. Moisture in the reaction gas moves to the dry gas side through the water retention portion. The humidity control means is disposed in at least one of fuel electrode side or air electrode side gas passages.

Besides, it is preferable that the humidity control means is disposed in the latter half portion, because flooding often occurs downstream the gas passage.

Moreover, non-humidified, reaction gas (fuel or oxidant) before supplying to the cell can be used as dry gas for dehumidification, and after being used for dehumidification, a part or all thereof or adding newly reaction gas can be supplied to the fuel cell.

In this case, flooding that often occurs downstream the passage can be prevented and the cell performance can be improved, as water can be discharged at the area where the reaction gas became wetter and the humidity can be lowered.

BRIEF DESCRIPTION OF THE DRAWINGS

These and other objects and advantages of the present invention will become clear from the following description with reference to the accompanying drawings, in which.

DETAILED DESCRIPTION OF THE PREFERRED EMBODIMENT

Now, preferred embodiments of the present invention shall be described concretely referring to attached drawing.

First Embodiment

Figure 1:
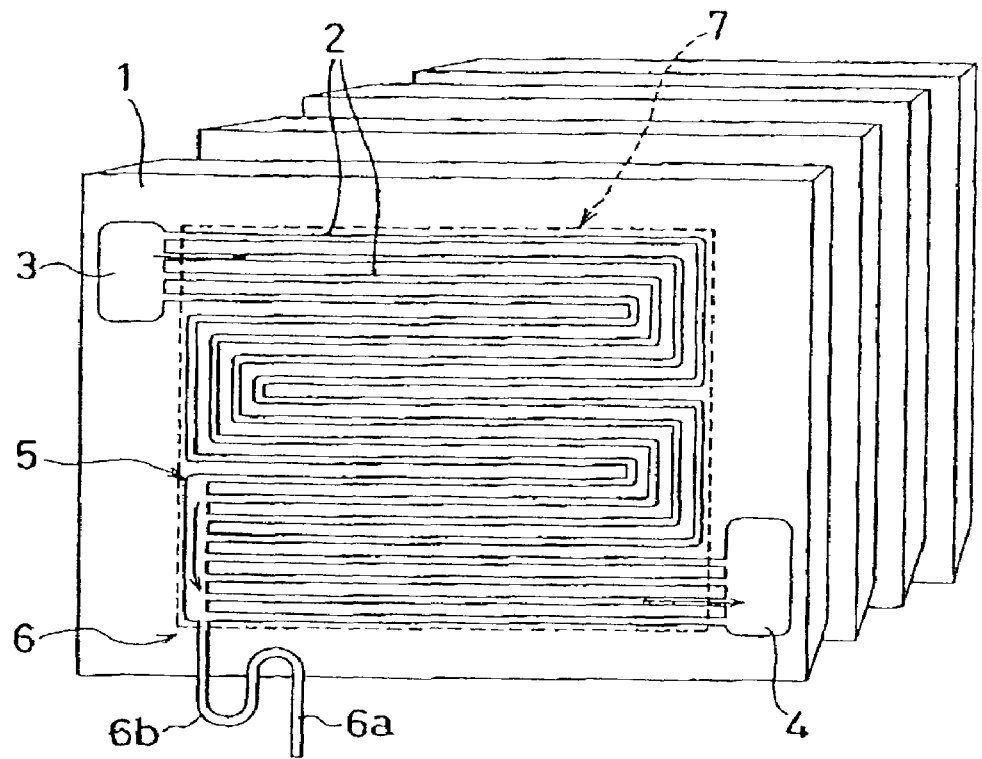
FIG. 1 is a schematic diagram showing a first embodiment of the present invention.

FIG. 1 shows a first embodiment of the present invention; in the drawing, 1 indicates an air electrode side separator, a plurality of concave groove shape passages 2 are formed in a bent shape through a return on the surface thereof, the starting end portion is connected to a supply manifold 3 of oxidant gas and the terminal end portion is connected to a drainage manifold 4. Consequently, oxidant gas enters the passage 2 from the supply manifold 3 and is discharged from the drainage manifold 4 after having passed through this passage 2.

The separator 1 has a connection portion 5 communicating a plurality of passage 2 each other disposed downstream the middle in the passage 2, for instance at the last return portion, and a drainage means 6 disposed under this connection portion 5. In this case, the discharge means 6 is composed of a drain pipe 6 bent substantially in S-shape, the upper end of this drain pipe 6a is communicated with the lower portion of the connection portion 5 in communication, while the lower end is open to the outside.

In the thus composed separator 1, when humidified oxidant gas is supplied from the supply manifold 3, it flows through the passage 2, and together with fuel gas flowing through, though not shown, the passage of a fuel electrode side separator, and generate an electromotive force by the electrochemical reaction through an electrolyte membrane. The passage 2 of the separator 1 is designed so that oxidant gas flows averagely in a reaction zone 7 (shown by the broken line) in close contact with an air electrode (not shown) and, moreover, the size of flow area increases.

Thus, water generated on the air electrode side gets mixed with oxidant gas flowing in the passage 2 of the separator 1, the water vapor partial pressure in the oxidant gas as it goes downstream, creating a supersaturated state.

In this first embodiment, as the connection portion 5 is disposed downstream the passage 2 of the separator 1 as mentioned above, the flow speed decreases when the oxidant gas attains this connection portion 5, the supersaturated water vapor condenses, producing condensate water. This condensate water flows down the connection portion 5, flows in the drain pipe 6a of the drainage means 6, and discharged outside from the opening at the lower end. At this time, as a U-shape bent portion of the drain pipe 6a becomes a water seal portion 6b and act as gas seal, oxidant gas does not bleed outside through the drain pipe 6a, but passes through the passage 2 more downstream than the connection portion 5 and is discharged from the discharge manifold 4.

Condensate water deposits on the surface of the passage 2 and clogs less often downstream, because condensate water produced upstream the separator 1 can be discharged outside by the drainage means 6 in this way. Consequently, the oxidant gas is supplied appropriately, therefore a normal electrochemical reaction is maintained, without deterioration the power generation performance.

Though the drainage means 6 is disposed under the connection portion 5 in the aforementioned embodiment 1, it is also possible to discharge condensate water outside only by the drainage means 6 without disposing the connection portion 5. In this case, for instance, it is preferable to compose so that the upper end portion of the drain pipe 6a of the drainage means 6 branches and connects respectively to a plurality of passages 2. Moreover, in order to attach the drain pipe 6a stably, a concave groove is formed in the separator 1 and the drain pipe is engaged in the concave groove.

Second Embodiment

Figure 2:
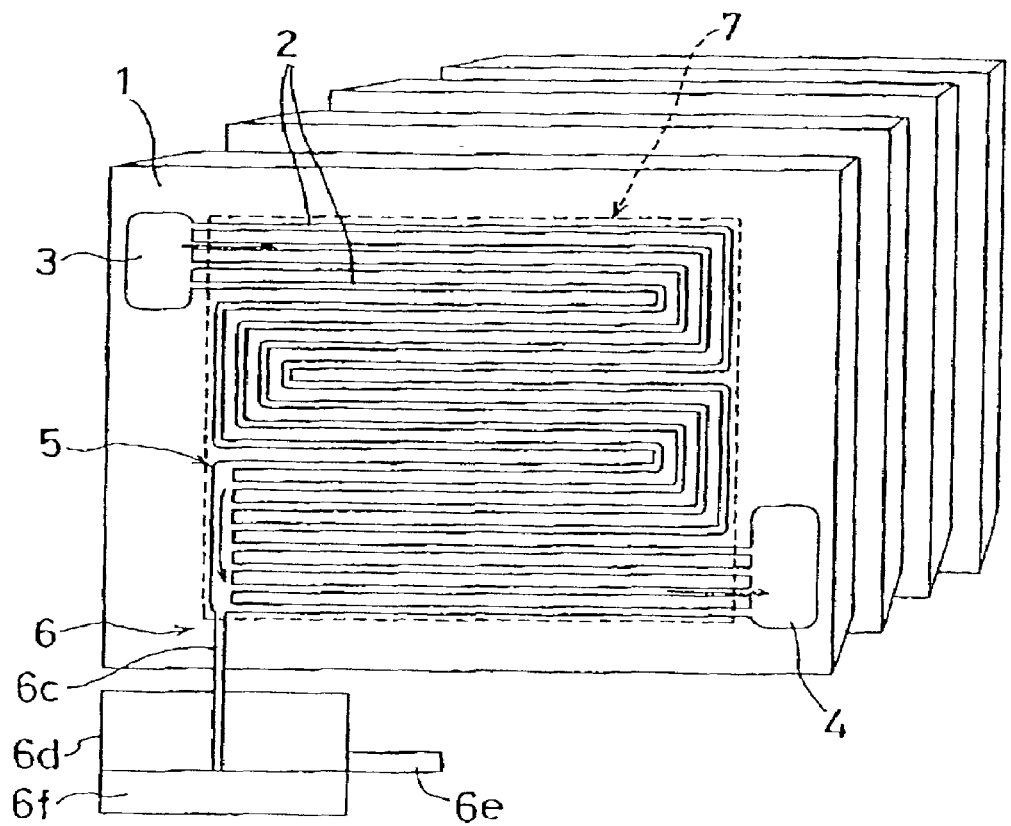
FIG. 2 is a schematic diagram showing a second embodiment of the present invention.

FIG. 2 shows a second embodiment of the present invention, substantially similar to the first embodiment, except for the composition of the drainage means 6. In short, in this case, in place of using a S-shape drain pipe, the drainage means 6 is composed of a straight pipe 6c and a drain tank 6d communicated with the lower end portion of this straight pipe 6c. The drain tank 6d has a discharge pipe 6e mounted at a predetermined height from the bottom wall of the drain tank 6d, retains a fixed quantity of drain (condensate water) inside, and forms a water seal portion 6f becoming as gas seal, by positioning the lower end portion of the straight pipe 6c in this drain.

Third Embodiment

Figure 3:
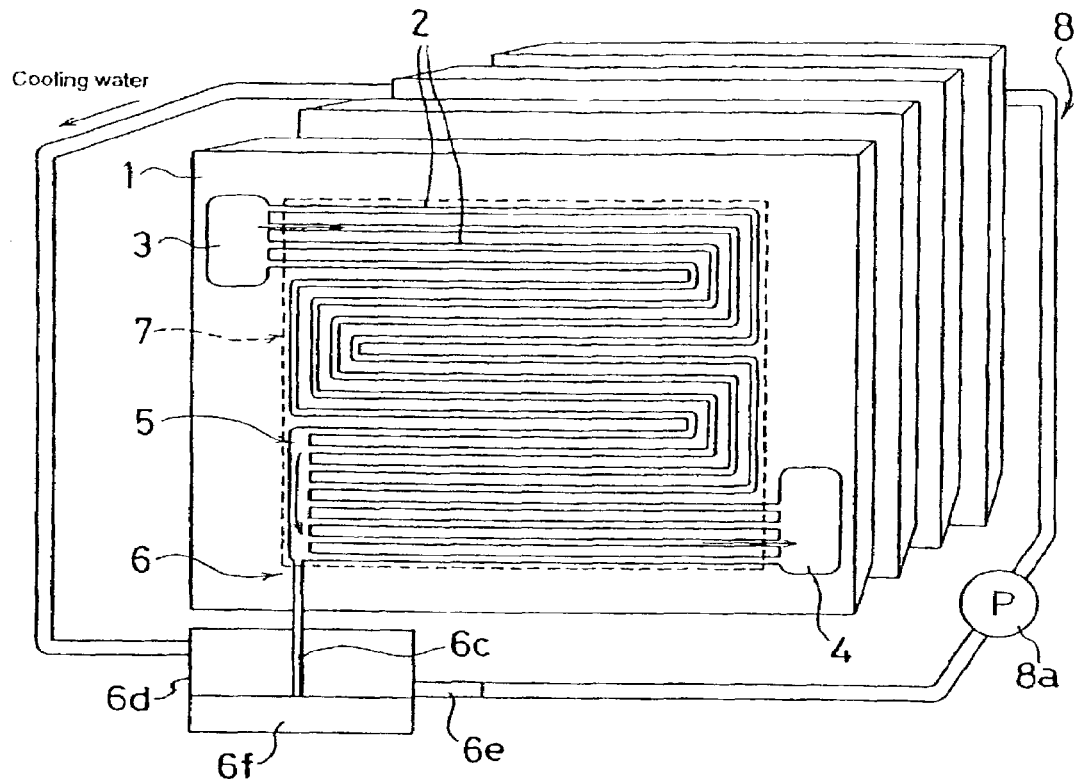
FIG. 3 is a schematic diagram showing a third embodiment of the present invention.

FIG. 3 shows a third embodiment of the present invention which develops further the aforementioned second embodiment, and intends to effectively use drain (condensate water) discharged from the drain tank 6d as a part of cooling water of the fuel cell. The temperature of the polymer electrolyte fuel cell elevates because the electrochemical reaction generates heat as mentioned above. Consequently, in practice, the fuel cell is held at an appropriate temperature, say at 80° C., by supplying cooling water.

Based on the aforementioned intention, a composition is adopted for connecting the drain tank 6d to the water cooling path 8. Drain (condensate water) discharged from the discharge pipe 6e of the drain tank 6d is delivered to the cooling portion of the fuel cell as cooling water by a pump 8a, while the cooling water discharged from the cooling portion returns to the drain tank 6d. The cooling portion of the fuel cell is normally composed of a passage of cooling water (not shown) disposed on the back side of the separator of respective cells.

By such a composition, the condensate water can be used effectively as cooling water for cooking the fuel cell in place of rejecting outside from the drain tank 6d. Moreover, the drain tank 6d can be common with a conventional water tank. The lack of cooling water is compensated with supplying the drain tank 6d with city water.

Fourth Embodiment

Figure 4:
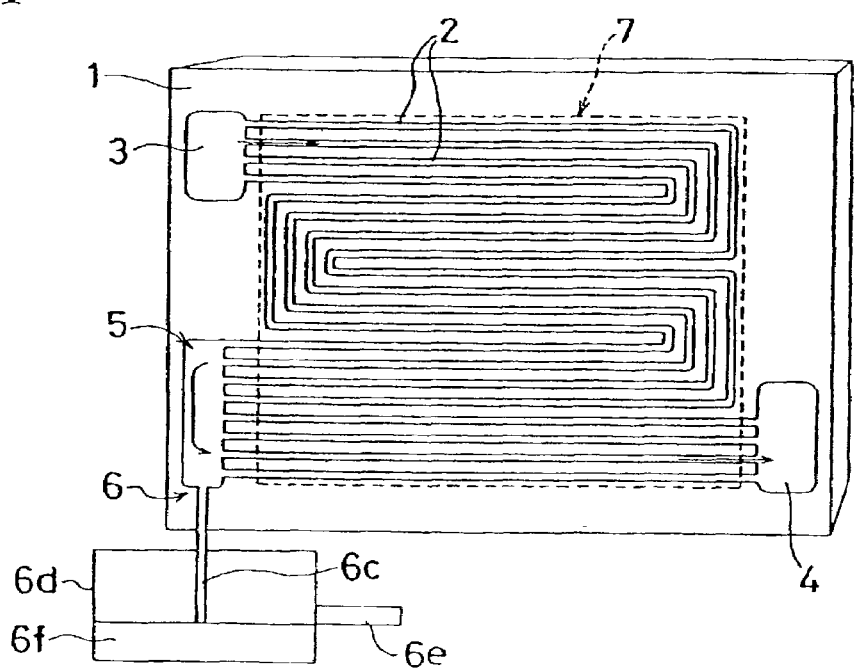
FIG. 4 is a schematic diagram showing a forth embodiment of the present invention.

FIG. 4 shows a fourth embodiment of the present invention, substantially similar to the aforementioned second embodiment, except for the composition in which the connection portion 5 is positioned out of a reaction zone 7 of the fuel cell. In short, the connection portion 5 is disposed outside the reaction zone 7 where the electrolyte membrane is sandwiched between the fuel electrode and the air electrode, more concretely, in the lower portion of the supply manifold 3.

In the reaction zone 7 of the fuel cell, the exothermic reaction elevates the temperature, while the temperature remains low outside the reaction zone 7, and water vapor in the connection portion 5 is cooled and condensed easily. Consequently, the cooling becomes more effective than the case of disposing the connection portion 5 in the reaction zone 7, producing thereby much condensate water, and this condensate water is discharged into the drain tank 6d by the drainage means 6.

Fifth Embodiment

Figure 5:
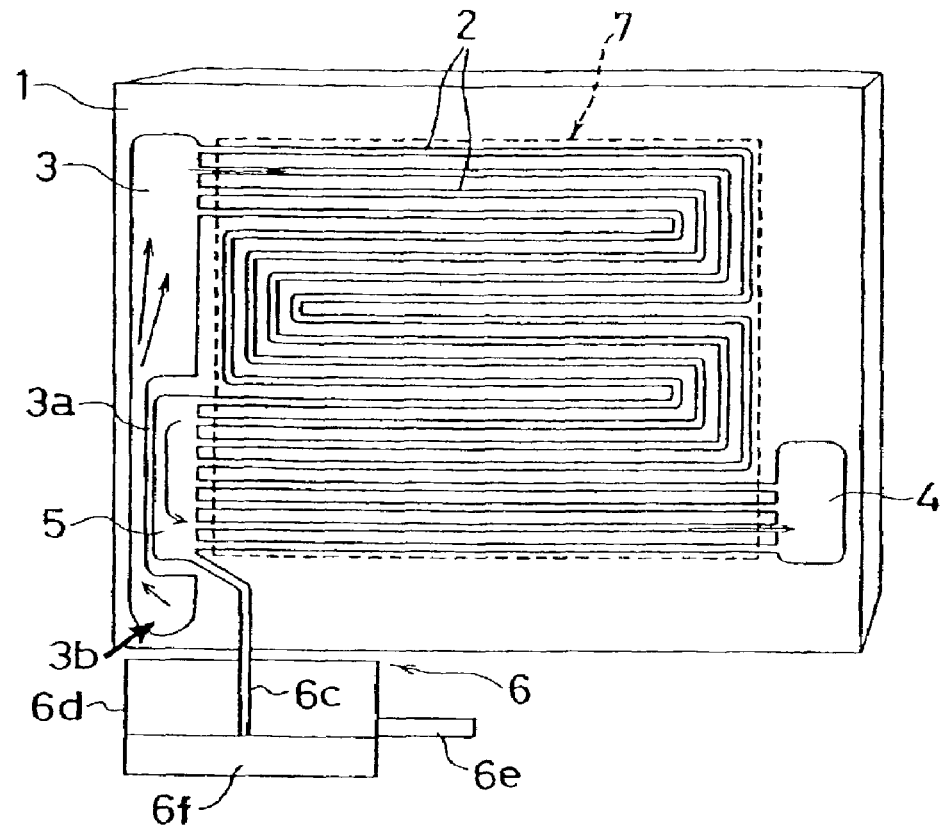
FIG. 5 is a schematic diagram showing a fifth embodiment of the present invention.

FIG. 5 a fifth embodiment of the present invention which develops further the aforementioned fourth embodiment, and is characterized by a composition of associating the connection portion 5 with the supply manifold 3. In short, the connection portion 5 protrudes into the supply manifold 3, and a throttle passage 3a is formed in the supply manifold 3. The supply manifold 3 is formed longer that those of the aforementioned first to fourth embodiments, allowing the oxidant gas flowing in from an introduction port 3b at the lower end portion, and arriving at the upper portion through the throttle passage 3a and entering the passage 2.

In this case, as the oxidant gas before delivering to the fuel cell reaction flows in from the introduction port 3b of the supply manifold 3, it is cooler than the oxidant gas passing through the connection portion 5 and the oxidant gas passing through the connection portion 5 is cooled by a cold oxidant gas passing through the throttle passage 3a, because the throttle passage 3a of the supply manifold 3 is adjacent to the connection portion 5. In short, the oxidant gas flowing in the connection portion 5 and oxidant gas before serving the fuel cell reaction exchange heat. Whereby, the cooling effect in the connection portion 5 is improved compared to the fourth embodiment, and the drain effect can further be improved.

The supply manifold 3 communicates in the cell stacking direction of the fuel cell and, normally, the oxidant gas is supplied from the end portion of the fuel cell, or from the introduction port 3b of the outermost separator. The introduced oxidant gas reached at the upper portion passing through the throttle passage 3a, and is supplied to the passage 2 of respective separator 1, and the flow distribution in the cell stacking direction is uniformed by the throttle passage 3a. Consequently, the passage 2 of respective separator 1 will be supplied with a substantially equal quantity of oxidant gas and, as a result, an effective power generation is realized, without making the cell reaction irregular for respective cells. In respective cells, unreacted oxidant gas in the reaction zone 7 is discharged in the drainage manifold 4, and discharged outside the fuel cell passing through this drainage manifold 4 communicating in the cell stacking direction.

Sixth Embodiment

Figure 6:
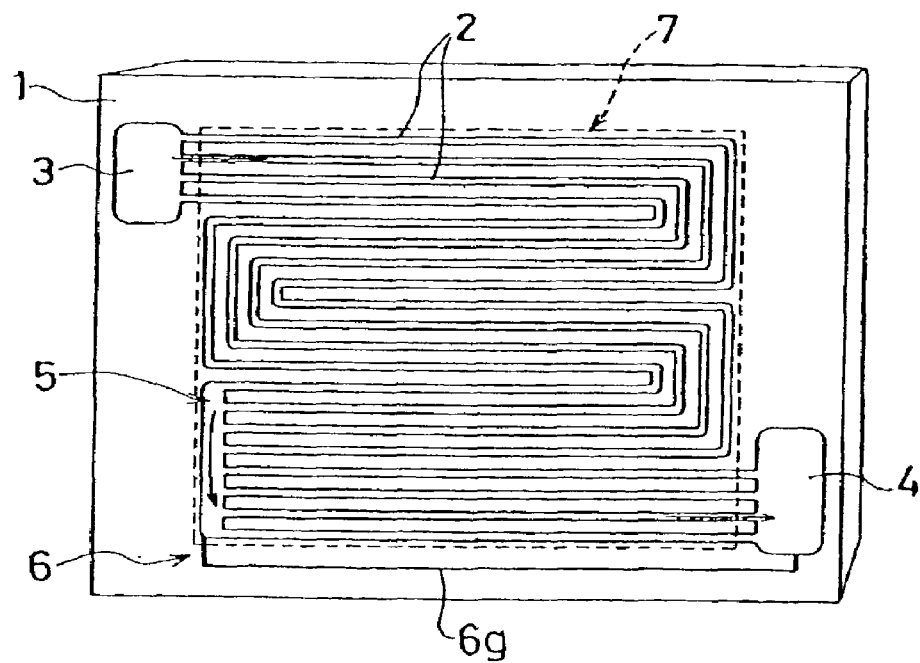
FIG. 6 is a schematic diagram showing a sixth embodiment of the present invention.
Figure 7:
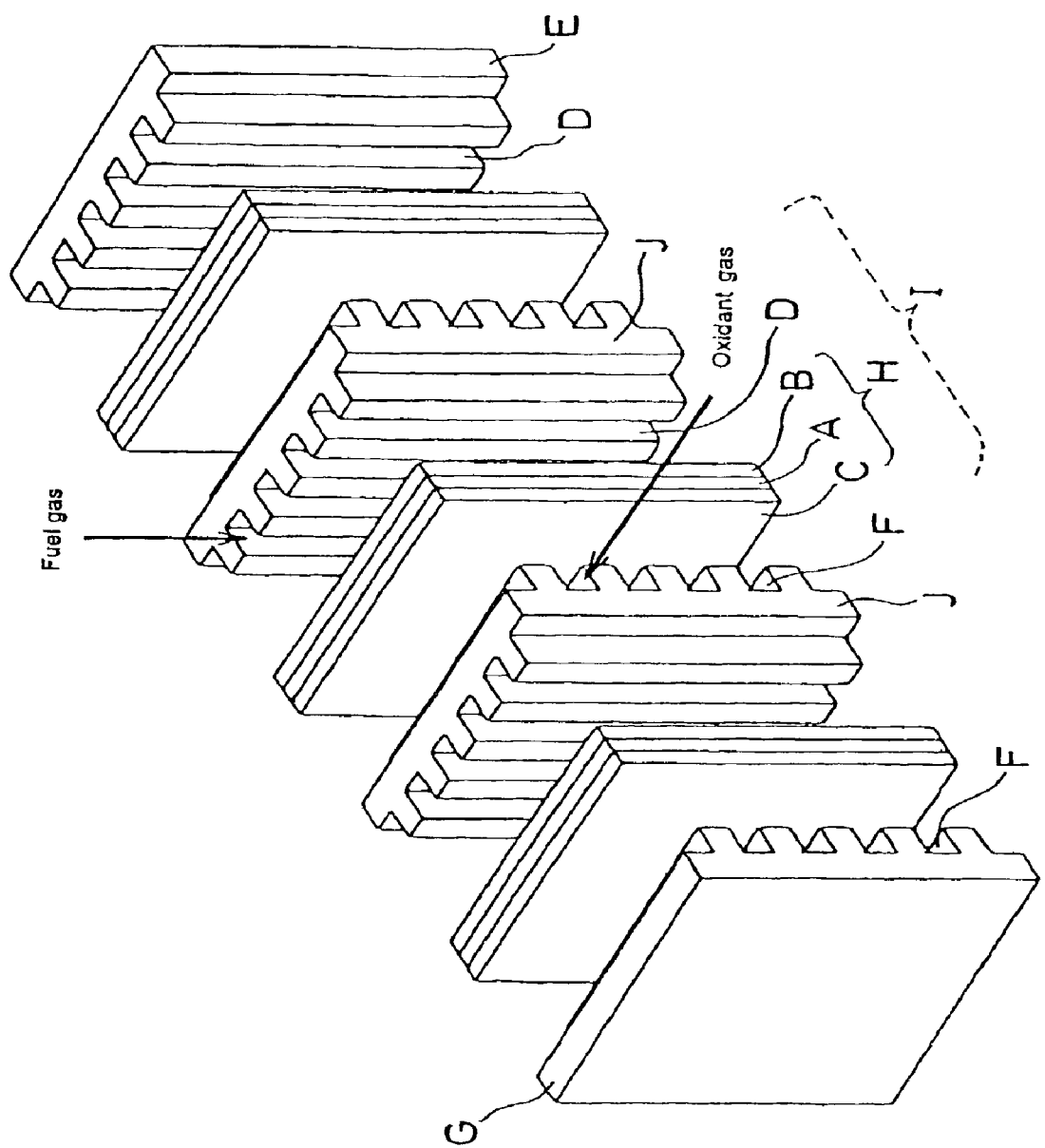
FIG. 7 is an illustration showing an example of the cell structure of a general polymer electrolyte fuel cell of the prior art.

FIG. 6 shows a sixth embodiment of the present invention, in which the drainage means 6 is provided in the separator 1. In short, separately from the passage 2 of oxidant gas, a path 6g communicating the drainage manifold 4 which is an exit of the gas and the connection portion 5 is used as drainage means 6. This path 6g can be composed easily by forming a concave groove at the surface lower end portion of the separator 1. It is preferable to lay a textile material (not shown) such as, for example, absorbing non-woven fabric, woven presenting an excellent water absorbing property by capillarity, or others in this path 6g.

In this case, condensate water produced in the connection portion 5 flows in the path 6g used as drainage means 6 and, at the same time, is discharged into the drainage manifold 4 through this path. Condensate water discharged in the drainage manifold 4 is discharged outside with the oxidant gas passing through this drainage manifold 4 communicating in the cell stacking direction of the fuel cell. Textile material laid in the path as mentioned above is replete with condensate water, preventing oxidant gas from bleeding in the path 6g.

Though in all of the aforementioned embodiments, the passage 2 of the separator 1 on the air electrode side is supplied with wet oxidant gas, it is also possible to apply the aforementioned embodiment to an example in which the separator passage is supplied with wet oxidant gas on the fuel electrode side.

Besides, though the connection portion 5 mentioned above is installed by protruding in the oxidant gas supply manifold area, it may also be disposed adjacent to a cooling water supply manifold (not shown) to be installed in the cooling portion of the fuel cell, in order to exchange heat between oxidant gas passing through the connection portion 5 and the cooling water. Moreover, though not shown, in the case of applying to the fuel electrode side, the connection portion is installed by protruding in the fuel gas supply manifold area and, in this case also, it is also possible to exchange heat between fuel gas passing through the connection portion and the cooling water, by disposing it adjacent to a cooling water supply manifold (not shown) to be installed in the cooling portion of the fuel cell.

Though the bend shape separator passage having returns has been illustrated in the aforementioned embodiment, it is not limited to this, but can satisfactorily applied to linear or other passages of any shape.

As mentioned above, according to the present invention, as the drainage means is provided downstream the middle of oxidant gas or fuel gas passage of the fuel cell, a part of condensate water produced upstream the cell can be discharged. Therefore, the passage is clogged less often by the condensate water in the downstream. Moreover, the installation of the connection portion reduces the gas flow rate, facilitates the production of condensate water, and thereby directs more condensate water to the drainage means. Further, the cooling efficiency can be improved and heat can be exchanged by installing the connection portion outside the cell reaction zone, or in protrusion into the supply manifold area of oxidant gas or fuel gas.

According to the present invention, a polymer electrolyte fuel cell is capable of removing condensate water by a composition of simple structure and easy to process, having effects of preventing the power generation performance from lowering due to the condensate water, and generating power effectively by the fuel cell.

Further, other embodiments of the present invention shall be described.

Seventh Embodiment

Figure 8:
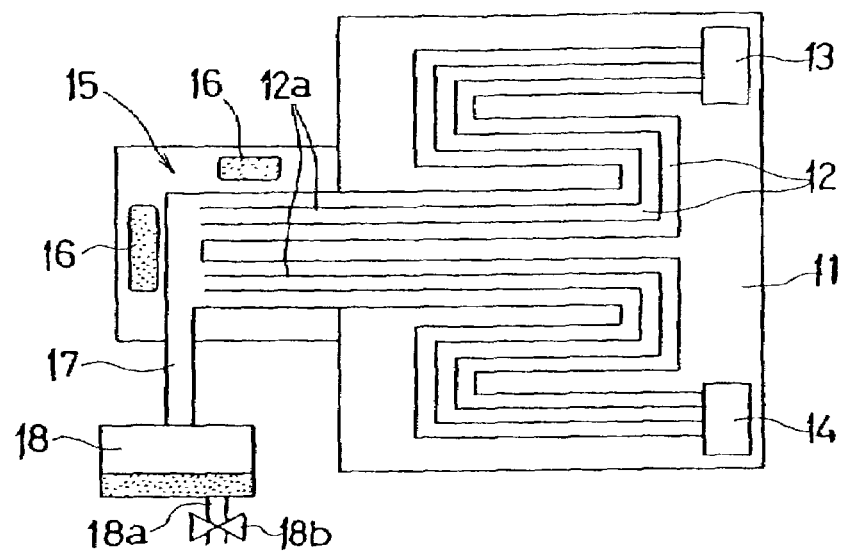
FIG. 8 is a schematic diagram of fuel cell essential parts showing a seventh embodiment of the present invention.

FIG. 8 shows a seventh embodiment of the present invention, and is a schematic diagram of a part of a separator 11 in the stack of the polymer electrolyte fuel cell, and a plurality of meandering passages 12 adjacent each other are formed on the electrode face thereof.

For this passage 12, a supply port 13 for supplying a reaction gas (fuel or oxidant) is formed on one end side, while a discharge port 14 for discharging the reaction gas is formed on the other end side. Besides, a part of the path from the supply port 13 to the discharge port 14 passes through a temperature adjustment means 15 provided on the side portion of the separator 11.

The temperature adjustment means 15 is a cooling system, and a plurality of (two) cooling water passages 16 are formed near the prolongation 12a of the passage 12, and a drainage passage 17 communicating with the prolongation 12a is provided and connected to the drain portion 18. The drain portion 18 is composed of a tank or the like, and a discharge pipe 18a is attached to the bottom portion thereof, and an on-off valve 18b is mounted on this discharge pipe 18a.

The temperature adjustment means 15 can be composed, for instance, by forming with a plate element, and stacking a plurality thereof similarly to the separator 11. In this case, the cooling water passage 16 communicates in the stacking direction similarly to the supply port 13 and the discharge port 14 of the separator 11. Though this temperature adjustment means 15 is disposed substantially at the middle of the passage 12 in FIG. 1, it is preferable to provide in the latter half portion where the relative humidity elevation is rapid.

In a thus composed fuel cell, when the reaction gas is supplied from the supply port 13 of the separator 11, it flows through the passage 12 and provokes an electrochemical reaction in the cell unit through the solid polymer membrane. First, the reaction gas flowing in the passage 12 is humidified with water produced by the electrochemical reaction, and its relative humidity increases gradually. The reaction gas whose humidity became high is introduced into the temperature adjustment means 15 through the prolongation 12a of the passage 12.

In the temperature adjustment means 15, the reaction gas is cooled by the cooling water flowing through the cooling water passage 16. The reaction gas is humidified as mentioned above in order to moisturize the solid polymer membrane, and the reaction gas contains water vapor. The water vapor in this reaction gas is condensed by being cooled through the temperature adjustment means 15, and received in the drain portion 18 through the drainage passage 17.

The water vapor in the passage 12 becomes supersaturated, because water is produced along with the electrochemical reaction on the air electrode side and moisture is borne along with the displacement of proton from the fuel electrode side, in the separator 11 where the oxidant gas flows. Consequently, water vapor contained in the oxidant gas is cooled by the temperature adjustment means 15 and generate a quantity of condensate water. This condensate water is received in the drain portion 18 through the drainage passage 17 as mentioned above.

Condensate water received in the drain portion 18 can be used as cooling water of the temperature adjustment means 15 and also as humidifying water for the fuel cell if there is no fear of pollution.

In this way, the reaction gas is cooled by the temperature adjustment means 15, and after removal of water vapor therein as condensate water along with this cooling, again the reaction gas returns to the passage 12 in the electrode, face. Therefore, the deterioration of fuel cell performance can not be provoked, as moisture does not deposit in the downstream side of the passage 12 and inhibits the reaction gas from flowing as in the art. It should be appreciated that gas unreacted on the electrode face is discharged from the discharge port 14 of the separator 11.

Eighth Embodiment

Figure 9:
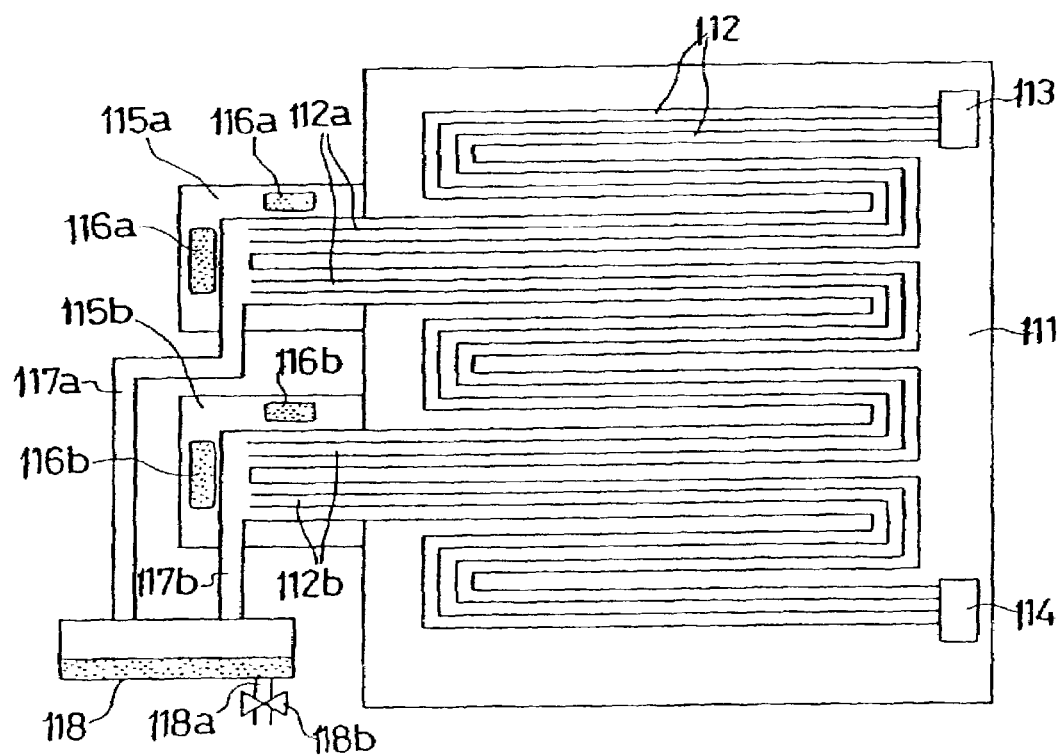
FIG. 9 is a schematic diagram of fuel cell essential parts showing an eighth embodiment of the present invention.

FIG. 9 shows an eighth embodiment of the present invention, in which the temperature adjustment means is provided at two points. In short, a first prolongation 112a and a second prolongation 112b are formed in a passage 112 of a separator 111, and the first prolongation 112a is composed to pass through a first temperature adjustment means 115a provided on the side portion of the separator 111 while the second prolongation 112b pass through a second temperature adjustment means 115b.

The first temperature adjustment means 115a is a cooling system provided with a plurality of cooling water passages 116a near the first prolongation 112a, a drainage passage 117a communicating with the first prolongation 112a, and this drainage passage 117a is connected to the drain portion 118. The second temperature adjustment means 115b is similarly a cooling system provided with a plurality of cooling water passages 116b near the second prolongation 112b, a drainage passage 117b communicating with the second prolongation 112b, and this drainage passage 117b is connected to the drain portion 118. A discharge pipe 118a is mounted on the bottom portion of the drain portion 118, and an on-off valve 118b is provided.

In a thus composed fuel cell, the reaction gas supplied from the supply port 113 of the separator 111 flows along the passage 112 and, at the same time, is directed into the first temperature adjustment means 115a through the first prolongation 112a, cooled therein, before returning to the passage 112 in the electrode face. In the first temperature adjustment means 115a, a part of water vapor of the reaction gas condensates, and this condensate water is received in the drain portion 118 through the drainage passage 117a.

Reaction gas returned into the electrode face is then introduced in the second temperature adjustment means 115b through the second prolongation 112b, cooled therein, before returning to the passage 112 in the electrode face. In this second temperature adjustment means 115b also, water vapor in the reaction gas condensates, and this condensate water is received in the drain portion 118 through the drainage passage 117b.

In this case, as the reaction gas is cooled down twice, condensate water is prevented more completely from depositing in the downstream of the passage 112 than the case of the seventh embodiment, the reaction gas flows well, the current distribution is minimized, improving the cell performance. It should be appreciated that unreacted gas is discharged to the discharge port 114 of the separator 111.

Ninth Embodiment

Figure 10:
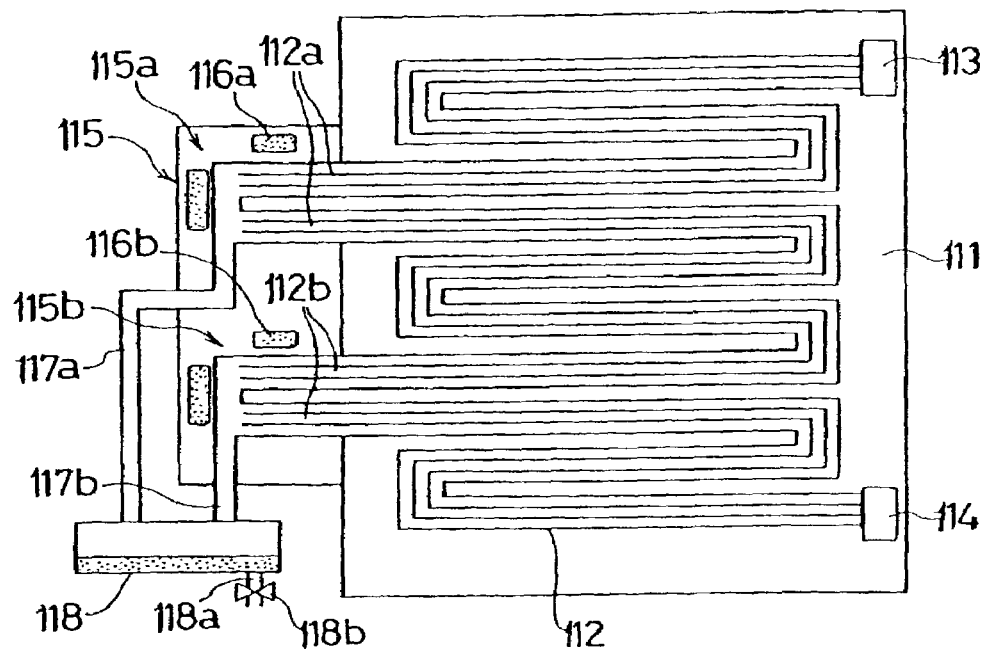
FIG. 10 is a schematic diagram of fuel cell essential parts showing a ninth embodiment of the present invention.

FIG. 10 shows a ninth embodiment of the present invention, similar to the eighth embodiment, in which a temperature adjustment means 115 grouping the first temperature adjustment means 115a and the second temperature adjustment means 115b in one place is provided. For the convenience of comprehension, same members as the eighth embodiment are indicated by the same symbol as before.

Tenth Embodiment

Figure 11:
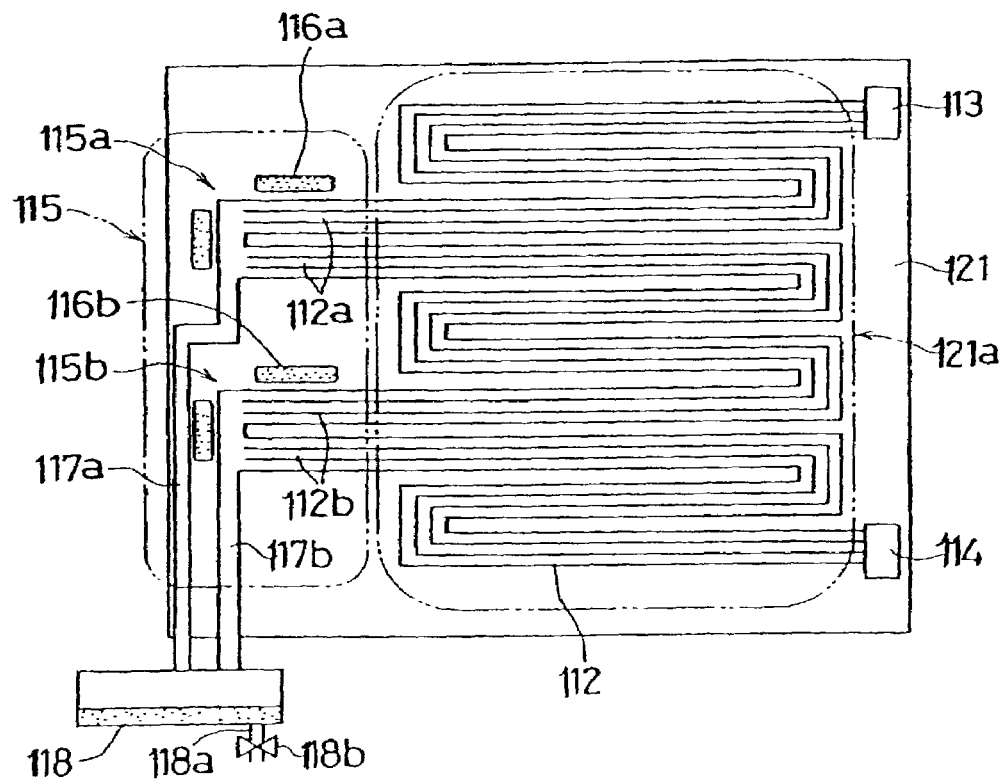
FIG. 11 is a schematic diagram of fuel cell essential parts showing a tenth embodiment of the present invention.

FIG. 11 shows a tenth embodiment of the present invention, in which the temperature adjustment means 115 in the ninth embodiment is integrated with a separator 121. In short, a temperature adjustment means 115 made of the first temperature adjustment means 115a and the second temperature adjustment means 115b is provided at a position outside the electrode face 121a of the separator 121. It becomes unnecessary to form the temperature adjustment means 115 separately, and add to the separator 121 afterward.

In any of seventh to tenth embodiments of the present invention, it is preferable to provide the temperature adjustment means with a temperature measurement portion for measuring the temperature of the reaction gas, and a flow adjustment portion for adjusting the flow of cooling water, and to adjust automatically the cooling water flow in respect to any temperature set value by a control system. Moreover, the coolant is not limited to the water, and it may be any other liquid, or gas such as air. The temperature adjustment means shall be installed in at least one of fuel electrode side or air electrode side gas passage.

Next, embodiments in which the water vapor in the reaction gas is adjusted by intermediate of the temperature adjustment means, for preventing the flooding which, otherwise, often occurs in the downstream of the gas passage.

Eleventh Embodiment

Figure 12:
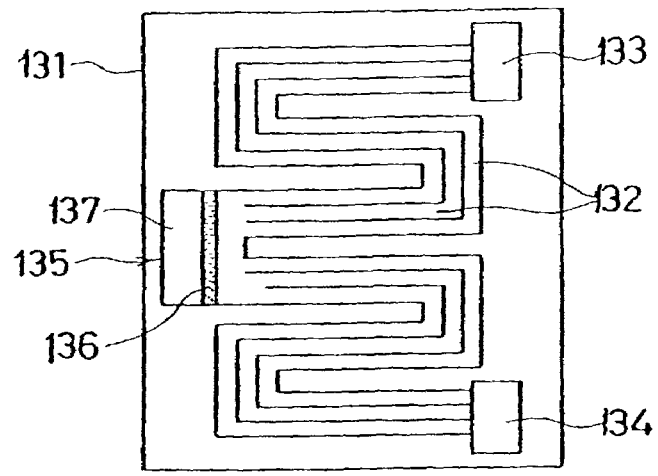
FIG. 12 is a schematic diagram of fuel cell essential parts showing an eleventh embodiment of the present invention.

FIG. 12 shows an eleventh embodiment of the present invention, in which 131 indicates a separator, a plurality of meandering passages 132 are formed adjacent to each others, a supply port 133 is supplied at one end side of the passage 132, and a discharge port 134 at the other end side and, moreover, a humidity adjustment means 135 is provided in the path of the passage 132.

The humidity adjustment means 135 is a dehumidifier system, composed of a water retention portion 136 becoming an outer wall of the passage 132 and a dehumidification passage 137 provided separately from the passage 132 in contact with this water retention portion 136. In this case, the water retention portion 136 composes an outer wall positioned substantially at the middle of the path of the passage 132. This water retention portion 136 partitions the passage 132 and the dehumidification passage 137.

The water retention portion 136 may use, for instance, poly acrylic base water absorbing resin, water absorbing sheet or other water absorbing polymer, material absorbing moisture into a substance by intermediate of capillarity, or others, that are folded thick so that the reaction gas may not penetrate. The dehumidification passage 137 is destined to pass dry gas for dehumidification, which is made into a direct contact with the water retention portion 136.

The humidity adjustment means 135 is installed substantially at the middle in the path of the passage 132, it is preferable to be installed it in the latter half portion as flooding often occurs in the downstream of the passage 132. Though not shown, it is also possible to provide a plurality of humidity adjustment means 135 in the path of the passage 132 similarly to the temperature adjustment means.

In a thus composed fuel cell, when the reaction gas is supplied from the supply port 133 of the separator 131, an electrochemical reaction is provoked through the slide polymer membrane of the cell unit, to generated electricity and water.

The relative humidity of the reaction gas increases as it flows through the passage 132. Moisture contained in this reaction gas whose relative humidity has increased is absorbed by the water retention portion 136 of the humidity adjustment means 135. Consequently, the relative humidity of the reaction gas is lowered by the humidity adjustment means 135. As the result, moisture condensates downstream the passage 132, and does not stick and clog the passage 132.

The water content of the water retention portion 136 increases gradually as it absorbs moisture in the reaction gas. As the water content increases, the water absorption decreases, therefore, the water retention portion 136 is dried and the water content is lowered by flowing dry gas for dehumidification into the passage for dehumidification 137.

Normally, dry reaction gas, nitrogen or other inactive gas are used as dehumidification gas to be supplied to the passage for dehumidification 137 and, in the case of using a reaction gas, a reaction gas before being supplied to the fuel cell, of equal or inferior to the saturation dew point in respect to the cell temperature may be used.

Figure 13:
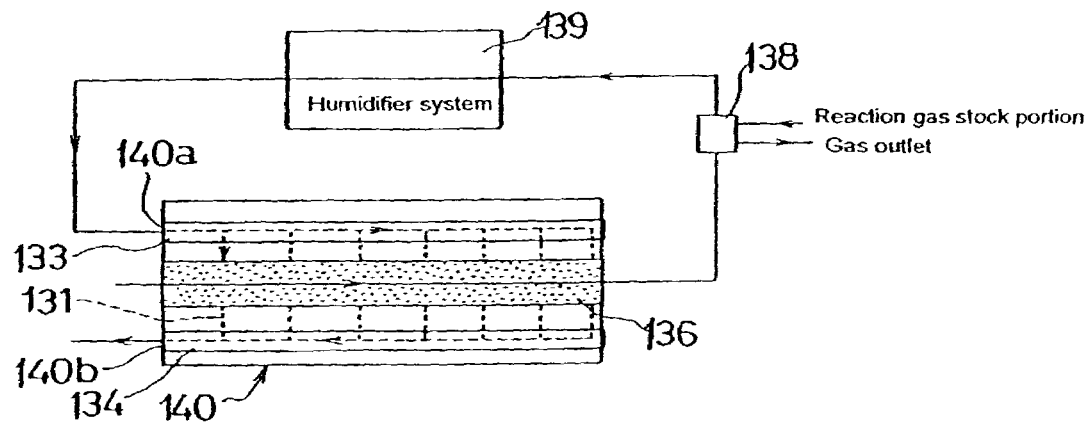
FIG. 13 is an illustration showing a supply path of dehumidifier system gas in the fuel cell of the present invention.

As shown schematically in FIG. 13, non-humidified reaction gas is used as dehumidification gas, which is supplied to the passage for dehumidification 137, made into contact with the water retention portion 136 to dry. A part or all of reaction gas after moisture absorption is introduced into a flow regulator 138 to adjust the flow rate. At this moment, a required quantity of new reaction gas may be supplied from a stock portion (not shown). The flow adjusted reaction gas is humidified appropriately by a humidifier 139 and, thereafter, is supplied to a gas supply port 140a disposed at an end portion of a fuel cell 140.

Wet reaction gas supplied to the gas supply port 140a passes through the supply port 133 communicating in the cell unit stacking direction of the fuel cell 140, and flows into the passage 132 of the separator 131 in respective cell units. The wet reaction gas flown into the passage 132 is submitted to the electrochemical reaction in the electrode face of the cell unit, and unreacted gas is discharged into the discharge port 134. The wet reaction gas flowing through the passage 132 is dehumidified by the water retention portion 136 when it passed through the humidity adjustment means 135.

Unreacted gas discharged from the discharge port 134 of the separator 131 passes through the discharge port 134 communicating in the cell unit stacking direction, and exits outside from a gas discharge port 140b provided an the end portion of the fuel cell.

As mentioned above, the wet reaction gas is supplied from the gas supply port 140a of the fuel cell 140, and its relative humidity elevates as it flows through the passage 132. There, it is possible to move moisture to the dry gas side through the water retention portion 136 and decrease the reaction gas temperature, by introducing dry gas into the passage for dehumidification 137. Thereby, flooding which often occurs downstream the passage 132 can be prevented, and power is generated under good conditions. Even if the gas passage is divided into a plurality, all can pass through the humidity adjustment means 135, by joining passages once at the water retention portion 136 or others means.

The humidity adjustment means 135 is not especially limited to one point, but it may be provided at a plurality of points to dehumidify in multistage. Otherwise, the dehumidifying gas may be preheated to the proximity of the cell temperature before supplying to the passage for dehumidification 137, in order not to affect the temperature distribution in the fuel cell. Further, in the case of supplying the dehumidification gas from the end portion of the fuel cell 140, if it is supplied only from one end, the dehumidification gas becomes wet in the downstream side separator 131, and the dehumidification becomes less effective. Then it is effective to provide a plurality of supply ports of dehumidification gas at both ends, middle or other points of the fuel cell, so that substantially uniform dehumidification gas is distributed to any separator.

Twelfth Embodiment

Figure 14:
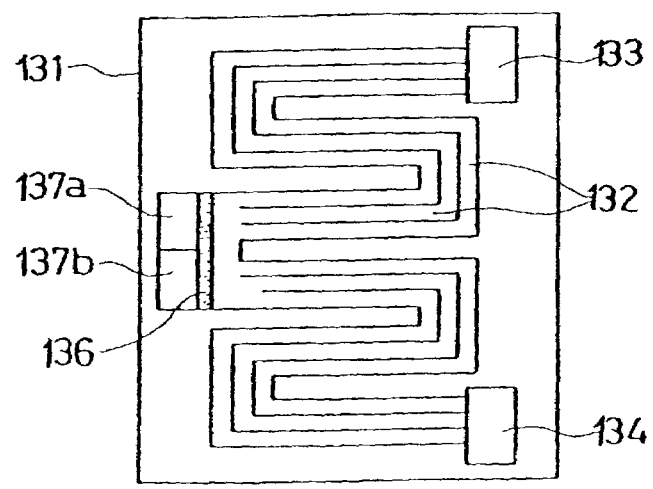
FIG. 14 is a schematic diagram of fuel cell essential parts showing a twelfth embodiment of the present invention.

FIG. 14 shows a twelfth embodiment of the present invention, in which a plurality of passages for dehumidification is provided. In this case, a first passage for dehumidification 137a and a second passage for dehumidification 137b are disposed by dividing into upper and lower two stages, and the flow direction of dehumidification gas is reversed for the first passage for dehumidification 137a and the second passage for dehumidification 137b.

In thus composed fuel cell, the dehumidification can be uniformed by supplying dehumidification gas from both ends of the fuel cell in the opposed direction. It should be appreciated that the same members as the eleventh embodiment are indicated by the same symbols.

As described hereinbefore, according to the present invention, the reaction gas passage of the fuel cell is so composed that the reaction gas passes through a temperature adjustment means provided out of the electrode face in the course of a passage from the supply port to the discharge port of the separator, and returns again to the passage in the electrode face, the reaction gas is cooled by the temperature adjustment means, the flooding in the electrode face is prevented, and thereby, the power generation performance of the fuel cell can be improved.

The flooding in the electrode face can be prevented further more effectively, by providing the temperature adjustment means in the downstream side of the passage, or by providing a plurality of means.

Further, according to the present invention, the reaction gas passage of the fuel cell is so composed that the reaction gas is dehumidified by a humidity adjustment means provided in the course of a passage from the supply port to the discharge port of the separator, the flooding of the electrode face is prevented, and thereby, the power generation performance of the fuel cell can be improved. In this case also, the flooding can be prevented further more effectively, by providing the humidity adjustment means in the downstream side of the passage, or by providing a plurality of means.

While the presently preferred embodiment of the present invention has been shown and described, it will be understood that the present invention is not limited thereto, and that various changes and modifications may be made by those skilled in the art without departing from the scope of the invention as set forth in the appended claims.

What is claimed is:

1. In a fuel cell supplied with fuel and oxidant for power generation, a separator therefor comprising:
    a passage for fuel gas or oxidant gas on an electrode face surface of the separator, the passage consisting of only one supply port for receiving the fuel gas or oxidant gas and only one discharge port for discharging the fuel gas or oxidant gas;
    a temperature adjustment means provided on a side portion of the separator for adjusting temperature of the fuel gas or oxidant gas, wherein the temperature adjustment means is a cooling apparatus; and
    a part of the passage from the supply port to the discharge port passing through the temperature adjustment means, wherein the passage passes through the temperature adjustment means a plurality of times, and the cooling apparatus is provided with a drain portion for removing condensate water generated during the gas cooling from the passage.

2. The separator of claim 1, wherein the temperature adjustment means is disposed outside the electrode face surface.

3. The separator of claim 1, wherein a coolant passage to cool the fuel gas in the temperature adjustment means is formed near the part of the passage passing through the temperature adjustment means.

4. The separator of claim 3, wherein the temperature adjustment means is disposed in a latter half portion of the passage.

5. The separator of claim 3, wherein a coolant for the coolant passage is selected from the group consisting of liquid comprising water and gas comprising air.

* * * * *